Dec. 28, 1948.   G. H. HUFFERD ET AL   2,457,472
PACKLESS GLOBE VALVE
Filed May 15, 1944

INVENTORS
GEORGE H. HUFFERD
& GEORGE O. R. LINDGREN
BY
Richey & Watts
ATTORNEYS

Patented Dec. 28, 1948

2,457,472

UNITED STATES PATENT OFFICE 2,457,472

PACKLESS GLOBE VALVE

George H. Hufferd and George O. R. Lindgren, Cleveland, Ohio, assignors to The Weatherhead Company, Cleveland, Ohio, a corporation of Ohio Application May 15, 1944, Serial No. 535,611

3 Claims. (Cl. 251—31)

This invention relates to packless valves.

The principal objects of this invention are to increase the durability of a packless valve, and to avoid any bearing of a rotatable stem or the like on a diaphragm or similar sealing member. Other objects are to simplify and reduce the cost of valves of this type; to combine in one part an effective sealing element and a spring to urge the valve in one direction; and to operate the valve member positively in both directions through an imperforate sealing member. Other objects and advantages will appear from the following detailed description of a preferred embodiment of the invention.

Figure 1:
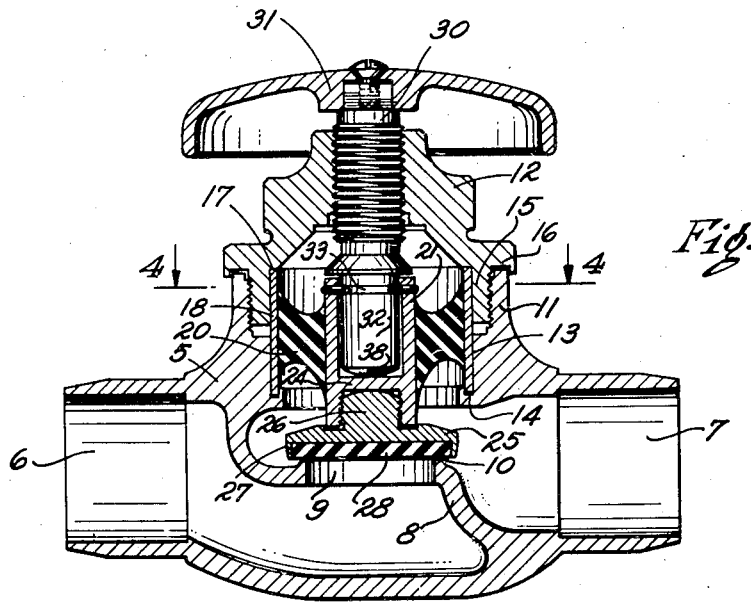
Fig. 1 is a vertical section through a valve embodying this invention.
Figure 2:
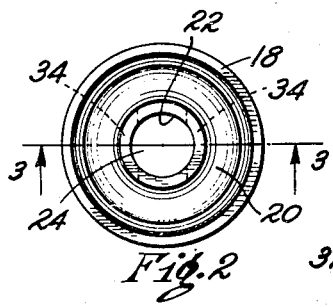
Fig. 2 is a top plan view of the sealing member before assembly in the valve.

Referring to the drawings, the present invention is illustrated in connection with a globe valve. The valve body 5 includes an inlet passage 6 and an outlet passage 7 separated by a web 8. An opening 9 surrounded by a valve seat 10 is formed in the web 8.

The body 5 is provided with an internally threaded flange 11 to receive the valve bonnet 12. Below the flange 11 the valve body is formed with a bore 13 smaller than the internal diameter of the flange 11 and terminating in a shoulder 14. The valve bonnet 12 is provided with an externally threaded flange 15 fitting within the flange 11, a shoulder 16 arranged to overlie the open end of the flange 11 and a shoulder 17 aligned with, and the same diameter as, the shoulder 14.

An annulus 18 fits snugly within the bore 13 and engages at its opposite ends the shoulders 14 and 17. A gasket or the like may be interposed between the lower end of the annulus 18 and the shoulder 14 if desired. When the valve bonnet 12 is screwed down the annulus 18 is firmly clamped between the shoulders 14 and 17 so as to form a fluid-tight seal between the lower end of the annulus and the shoulder 14.

An annular body 20 of rubber or rubber-like material is firmly bonded at its outer periphery to the inner surface of the annulus 18 and is also firmly bonded at its inner periphery to the outer surface of a valve stem 21. The body 20 may be made of rubber vulcanized to the stem 21 and the annulus 18, which may be made of steel or any other suitable metal, where the valve is for service with gases or fluids which do not attack rubber. Preferably, however, the body 20 is composed of neoprene (polychloroprene) or other thermosetting or curing synthetic rubber-like material vulcanized or otherwise bonded with fluid-tight joints to the annulus 18 and stem 21. Where the valve is for a service in which it is not subjected to a wide range of temperatures, thermoplastic elastomers may also be used. For convenience the term "rubber" is used in the claims to comprehend both natural and synthetic rubbers.

The stem 21 is formed with a bore 22 extending into the same from its upper end and a threaded bore 23 extended into the same from its lower end, the two bores being separated by an integral wall 24. The valve disc 25 is provided with a threaded stem 26 secured in the threaded opening 23 of the stem 21. Any suitable form of valve disc may be used, the form illustrated including a flanged metal holder 27 and a face 28 gripped within the holder 27 and arranged to be pressed against the valve seat 10. The face 28 may be of rubber or any other suitable material.

Figure 4:
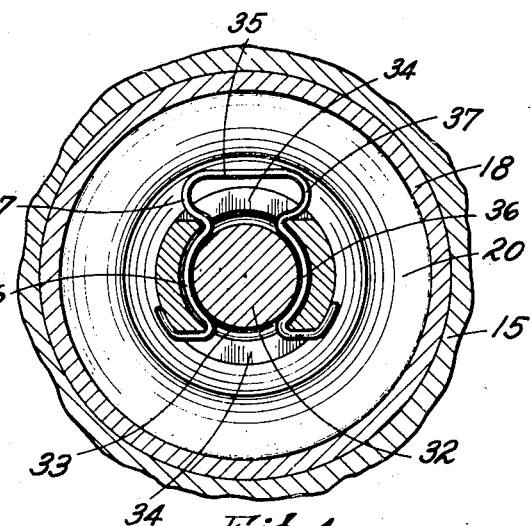
Fig. 4 is a section taken on the line 4—4 of Fig. 1.
Figure 5:
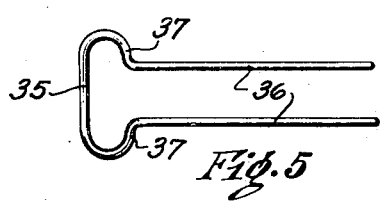
Fig. 5 is a view of the locking wire before assembly.

An operating stem 30 is threadedly engaged with the valve bonnet 12 and provided at its outer end with a handle 31. At its inner end the operating stem 30 is provided with a reduced extension 32 which fits loosely within the bore 22 in the stem 21. An annular groove 33 is formed in the extension 32 and oppositely disposed slots 34 are cut into the wall of the stem 21 in alignment with the groove 33. A wire locking member 35 is arranged to lock the operating stem 30 to the stem 21 to prevent axial separation while permitting relative rotation of the two stems. The locking member may be initially generally U-shaped as illustrated in Fig. 5 with legs 36 and a shouldered bight 37. The two stems 21 and 30 may be secured together by entering the legs 36 through one of the slots 34 into the groove 33, forcing the legs around through the groove 33 until they emerge through the opposite slot 34, and then clinching the legs back against the outer surface of the stem 21, as illustrated in Fig. 4.

With this arrangement it will be apparent that rotation of the operating stem 30 to cause the same to rise or fall positively lifts or depresses the valve disc 25, the operating stem 30 turning within the bore 22 in the stem 21. Preferably the projection 32 terminates in a rounded end 38 which bears against the upper surface of the wall 24 to transmit valve closing pressure directly to the stem 21 so that this pressure is not imposed upon the locking wire 35. The relatively smaller forces required to unseat and lift the valve are readily transmitted through the wire 35.

Figure 3:
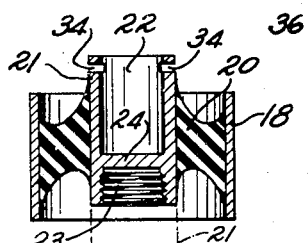
Fig. 3 is a section on the line 3—3 of Fig. 2.

The rubber-like body 20 is preferably molded in the form illustrated in Fig. 3 with the stem 21 having the position relative to the annulus 18 which it assumes when the valve is wide open. Thus the body 20 must be distorted to the position illustrated in Fig. 1 in forcing the valve closed, and the resiliency of the body 20 constantly urges the valve towards open position and normally prevents any loads being applied to the locking wire 35. With this arrangement it will be apparent that for certain applications no connection whatever need be provided between the operating stem 30 and the valve stem 21. In other applications, however, it may be necessary to apply a positive force to lift the valve from its seat, and for such installations the locking wire 35 or a similar swiveling connection is preferably used.

Although the preferred embodiment of the invention has been described in considerable detail it will be understood that many variations, modifications and rearrangements of parts may be resorted to without departing from the scope of the invention as defined in the following claims.

We claim:

1. A packless valve comprising a valve body having a valve chamber, a diaphragm chamber disposed above said valve chamber, and an annular shoulder between said chambers, said being formed with an annular groove opening toward said diaphragm chamber, a bonnet secured to said body, a sealing member comprising a sleeve having its lower end pressed into said groove and in sealing relation with said annular shoulder and its upper end engaged by said bonnet, an annular rubber diaphragm having its outer periphery bonded to said sleeve and a valve stem carried by and bonded to the inner periphery of said diaphragm, said diaphragm member being relatively thick in an axial direction and extending generally radially between its areas of attachment with said sleeve and stem, means carried by said bonnet for reciprocating said valve stem, and a valve closing member carried by the lower end of said stem.

2. A packless valve comprising a valve body having a valve chamber, a diaphragm chamber disposed above said valve chamber, an annular shoulder between said chambers, a bonnet secured to said body, a sealing member comprising a sleeve and a stem telescoped therewith, said sleeve having its lower end pressed into sealing engagement with said annular shoulder and its upper end engaged by said bonnet, a rubber-like diaphragm member bridging said sleeve and stem and bonded thereto, said diaphragm member being relatively thick in an axial direction and extending generally radially between its area of attachment with said sleeve and stem, said stem having a bore, laterally extending shoulder means in said bore disposed adjacent the face of said diaphragm member nearest to said annular shoulder, said stem having a portion extending past the other face of said diaphragm member, attachment means for a valve closing member formed on said extended stem portion, and a valve closing member mounted for motion in said valve and having means attached to said stem portion and means engaging said shoulder means.

3. A sealing member for a packless valve comprising a sleeve and a stem telescoped therewith, a rubber-like diaphragm member bridging said sleeve and stem and bonded thereto, said diaphragm member being relatively thick in an axial direction and extending generally radially between its area of attachment with said sleeve and stem, said stem having a bore, laterally extending shoulder means in said bore disposed adjacent one face of said diaphragm member, said stem having a portion extending past the other face of said diaphragm member, and attachment means for a stem operator formed on said extended stem portion.

GEORGE H. HUFFERD.
GEORGE O. R. LINDGREN.

REFERENCES CITED

The following references are of record in the file of this patent:

UNITED STATES PATENTS

| Number | Name | Date |
| --- | --- | --- |
| 679,062 | Staedeli | July 23, 1901 |
| 814,063 | Morgan | Mar. 6, 1906 |
| 930,635 | Warter | Aug. 10, 1909 |
| 975,444 | Lulli | Nov. 15, 1910 |
| 1,381,818 | Fulton | June 14, 1921 |
| 1,731,130 | Fulton | Oct. 8, 1929 |
| 1,885,457 | Lord | Nov. 1, 1932 |
| 2,005,103 | Moorhouse | June 18, 1935 |
| 2,059,111 | Joyce | Oct. 27, 1936 |
| 2,076,757 | Westberg | Apr. 13, 1937 |
| 2,118,300 | Ford | May 24, 1938 |
| 2,219,566 | Sauzedde | Oct. 29, 1940 |
| 2,264,656 | Briscoe | Dec. 2, 1941 |